United States Patent
Demsky et al.

(10) Patent No.: US 6,978,276 B2
(45) Date of Patent: Dec. 20, 2005

(54) METHOD AND SYSTEM FOR DETACHING FILES TO A SPECIFIED LOCATION

(75) Inventors: Scott H. Demsky, Boca Raton, FL (US); William R. Ferguson, Boca Raton, FL (US); Robert M. Szabo, Boca Raton, FL (US)

(73) Assignee: International Business Machines Corporation, Armonk, NY (US)

( * ) Notice: Subject to any disclaimer, the term of this patent is extended or adjusted under 35 U.S.C. 154(b) by 489 days.

(21) Appl. No.: 10/102,765

(22) Filed: Mar. 21, 2002

(65) Prior Publication Data

US 2003/0182331 A1 Sep. 25, 2003

(51) Int. Cl.[7] .............................................. G06F 17/30
(52) U.S. Cl. .................... 707/102; 707/10; 707/101; 707/104.1; 707/203; 707/205; 715/513; 709/206
(58) Field of Search .......................... 707/10, 203, 205, 707/201, 202, 204, 101, 102, 104.1; 709/206; 715/512, 513

(56) References Cited

U.S. PATENT DOCUMENTS

| | | | |
|---|---|---|---|
| 5,390,247 A | 2/1995 | Fischer | 380/25 |
| 5,598,183 A | 1/1997 | Robertson et al. | 345/145 |
| 5,740,370 A | 4/1998 | Battersby et al. | 395/200.49 |
| 6,021,408 A | 2/2000 | Ledain et al. | 707/8 |
| 6,078,808 A | 6/2000 | Fukutomi et al. | 455/412 |
| 6,182,279 B1 | 1/2001 | Buxton | 717/3 |
| 6,551,357 B1 * | 4/2003 | Madduri | 715/512 |
| 6,585,777 B1 * | 7/2003 | Ramaley et al. | 715/513 |
| 6,687,741 B1 * | 2/2004 | Ramaley et al. | 709/206 |
| 2002/0026481 A1 * | 2/2002 | Mori et al. | 709/206 |
| 2002/0107924 A1 * | 8/2002 | Walsh | 709/206 |
| 2003/0233620 A1 * | 12/2003 | Vedullapalli et al. | 715/522 |
| 2005/0050461 A1 * | 3/2005 | Hall et al. | 715/513 |

* cited by examiner

*Primary Examiner*—Thuy N. Pardo
(74) *Attorney, Agent, or Firm*—Akerman Senterfitt

(57) ABSTRACT

A method of detaching at least one file attached to an electronic document can include identifying a location where the attached file is to be stored responsive to a user command. The location can be associated with the attached file. A detached file can be generated from the attached file. The detached file can be stored at the associated location.

39 Claims, 7 Drawing Sheets

METHOD AND SYSTEM FOR DETACHING FILES TO A SPECIFIED LOCATION

BACKGROUND OF THE INVENTION

1. Technical Field

This invention relates to the field of electronic document processing, and more particularly, to the manipulation of attachment files.

2. Description of the Related Art

Presently, many software applications are capable of attaching copies of files to electronic documents. Common examples of such software systems include, but are not limited to, electronic mail systems, database systems, as well as collaborative systems such as Lotus Notes (TM). Once a file is attached to an electronic document, the file as well as the document can be transmitted over a computer communications network to other computer systems. Alternatively, multiple users can access the attached file using suitable collaborative software, typically over a computer communications network, as previously described. In any case, a recipient user or other user accessing an attached file can detach the file to a local system for further processing.

Conventional software systems can manipulate attached files in several ways. For example, the attached file can be viewed with a file viewer, launched or processed by another application, detached from the electronic document and stored to process the file locally, or in the case of a program file, can be executed. Presently, to detach a file from an electronic document and create a local copy of the attached file, a user must implement a multi-step process. Typically the user must highlight the file to be detached, select a detach option, and interact with a "file save" interface to specify a filename for the local copy of the attached file and the location to which the file is to be detached. This process can be tedious, especially where multiple files are to be detached. Although some systems do allow for multiple attachments to be detached simultaneously, each of the attachments must be detached to the same directory despite the type of attached file or the intended use of the attached file. Additionally, conventional systems first query the user as to where the user would like the attached files to be detached.

SUMMARY OF THE INVENTION

The invention disclosed herein provides a method and system for detaching files from electronic documents to locations associated with the attached files. Accordingly, a file attached to an electronic document can be automatically detached to a location within a data store such that a user need not specify the location to which the file is to be detached each time a file is detached from an electronic document.

One aspect of the present invention can include a method of detaching at least one file from an electronic document. The method can include identifying a location where the at least one attached file is to be stored responsive to a user command. The location can be associated with the attached file. A detached file can be generated from the attached file. For example, the detached file can be a copy of the attached file. Alternatively, the detached file can be the attached file having been removed from the electronic document. Regardless, the detached file can be stored at the associated location.

A second aspect of the present invention can include a method of detaching at least one file from an electronic document. The method can include identifying a location where the attached file is to be stored responsive to a user command, wherein the location is associated with the attached file. For example, the location can be associated with the particular files attached to the electronic document or the file type of the particular files attached to the electronic document. The location can be a local or remote location. For example, the location can be specified as a host and/or filename as well as a uniform resource locator (URL). In one embodiment, the location can be extracted from within the electronic document to which the file is attached.

Regardless, in one embodiment of the invention, a copy of the attached file can be made and then stored at the associated location. In another embodiment of the invention, the attached file can be removed from the electronic document and then stored at the associated location. Notably, the identifying step, the making a copy step or the removing step, and the storing step can be responsive to a single user command. Additionally, prior to the making a copy step or the removing step, the identified location can be replaced with a second user specified location. Notably, anytime a default or user specified location does not exist, the location can be created. Alternatively, the user can be queried for a new location.

A third aspect of the present invention can include a system for detaching at least one file from an electronic document. The system can include a graphical user interface configured to display at least one option for detaching at least one file from an electronic document to a location associated with the file, and a detachment processor configured to detach the file from the electronic document to the location associated with the file responsive to activation of one of the options in the graphical user interface. The detachment processor further can be configured to update the location with a second user specified location to which the file is to be stored.

A fourth aspect of the present invention can include a graphical user interface for detaching at least one file attached to an electronic document. The graphical user interface can include at least one option for detaching at least one file from an electronic document to a location associated with the file.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

The invention disclosed herein provides a method, system, and apparatus for detaching files from electronic documents to locations associated with the files. In particular, one or more files attached to an electronic document can be automatically detached to one or more locations associated with the files. Notably, as used herein, detaching can refer to making copies of files attached to electronic documents as well as removing files attached to electronic documents. Thus, according to the present invention, attached files can be removed from electronic documents and then stored. Alternatively, copies of the attached files can be made and the copies can be stored. In any case, the present invention enables a user to detach files from electronic documents without the user having to specify the particular location to which the user would like to detach the file each time a file is detached.

Figure 1:
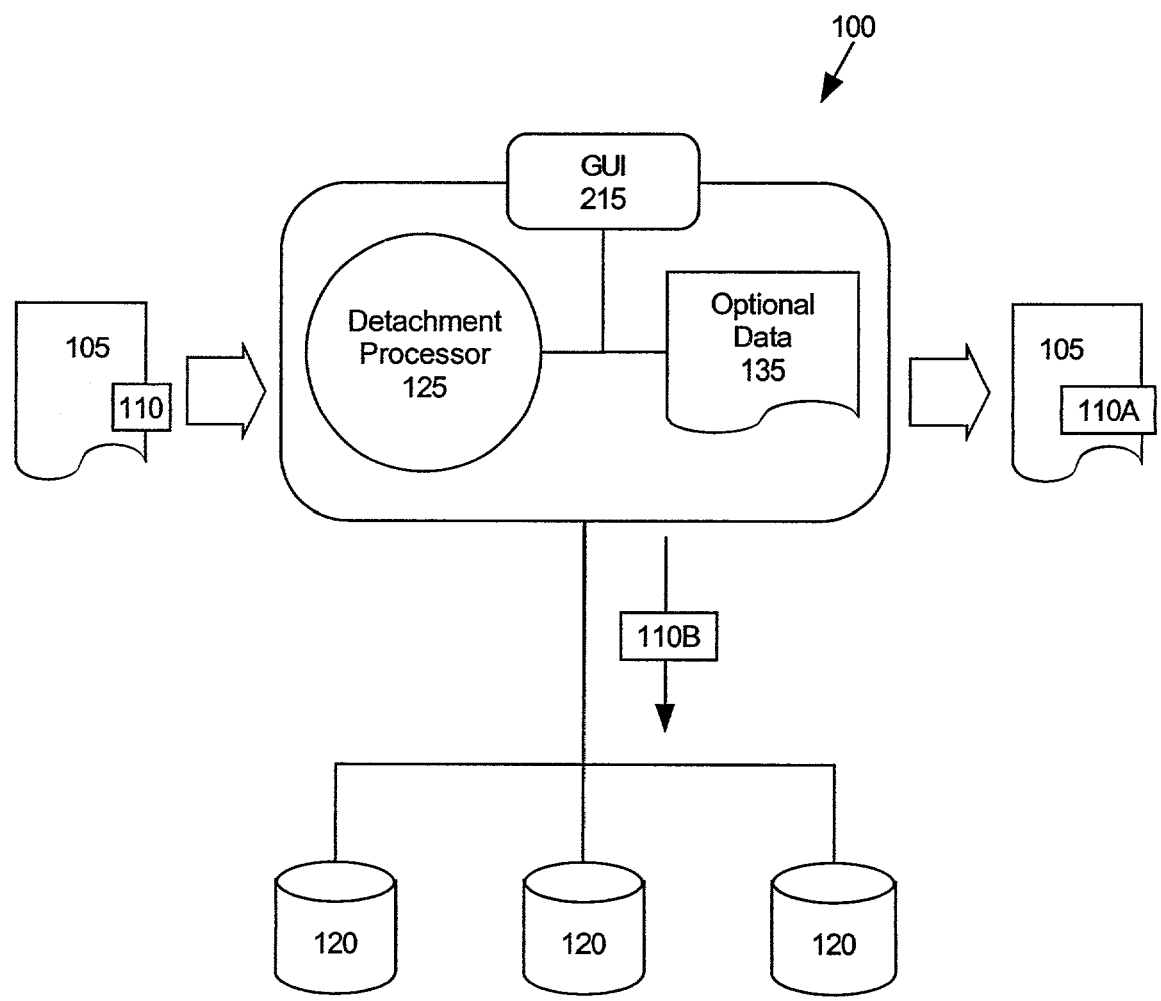
FIG. 1 is a schematic diagram illustrating a system for detaching files attached to electronic documents in accordance with the inventive arrangements disclosed herein.

FIG. 1 is a schematic diagram illustrating a system 100 for detaching files attached to electronic documents. As shown in FIG. 1, an electronic document 105 having a file 110 attached thereto, can be processed by the system 100. In particular, a copy of file 110 can be made and then stored at a location associated with file 110, while the originally attached file 110 remains attached to the electronic document. For example, file 110 can be stored at a location in any of the data stores 120, which can include data stores local to a user computer system, or any other data store communicatively linked to system 100. Notably, the particular location to which file 110 can be detached can be stored within the electronic document 105, within the system 100, or alternatively, can be specified by a user.

The system 100 can include a detachment processor 125, a graphical user interface (GUI) 215, as well as optional data 135. The detachment processor 125 can determine a default location to which the file 110 can be detached. The default location can include the location to which a file is to be detached, as well as the filename of the local copy of the attached file. Notably, the default location can specify a fully qualified location if necessary. The location further can be local or remote, and can be specified as a host name and/or filename, as well as a uniform resource locator (URL). The default location can be specified and stored in any of a variety of locations. In one embodiment of the present invention, the default location can be stored within the electronic document 105. For example, at the time the file is attached to an electronic document, the default location can be stored within an email, a markup language document, or other electronic document having an attachment. Alternatively, the default location can be specified within the optional data 135, locally on the user's computer system, or within another data store operatively connected to the invention disclosed herein via a computer communications network. Thus, the default location can be specified on a per attached file basis, a per file type basis, or the default location can be specified based upon the application designated to process the attached file. Accordingly, multiple attached files can be detached to a single default location or each attached file can be detached to a different default location.

Regardless of how a default location is specified, the detachment processor 125 can determine the default location and detach file 110 from the electronic document 105. According to one embodiment of the invention, a copy of file 110 can be made and subsequently stored at the default location. In that case, file 110B is a copy of the originally attached file 110, and file 110A is the file originally attached to the electronic document 105. Notably, after having processed the electronic document 105, file 110A, the originally attached file, is still attached to the electronic document 105. The detachment processor 125 further can be configured to present one or more GUIs, for example GUI 215, which can provide options for detaching one or more files to default locations, as well as for altering the default location of a particular attached file or type of attached file.

Figure 1A:
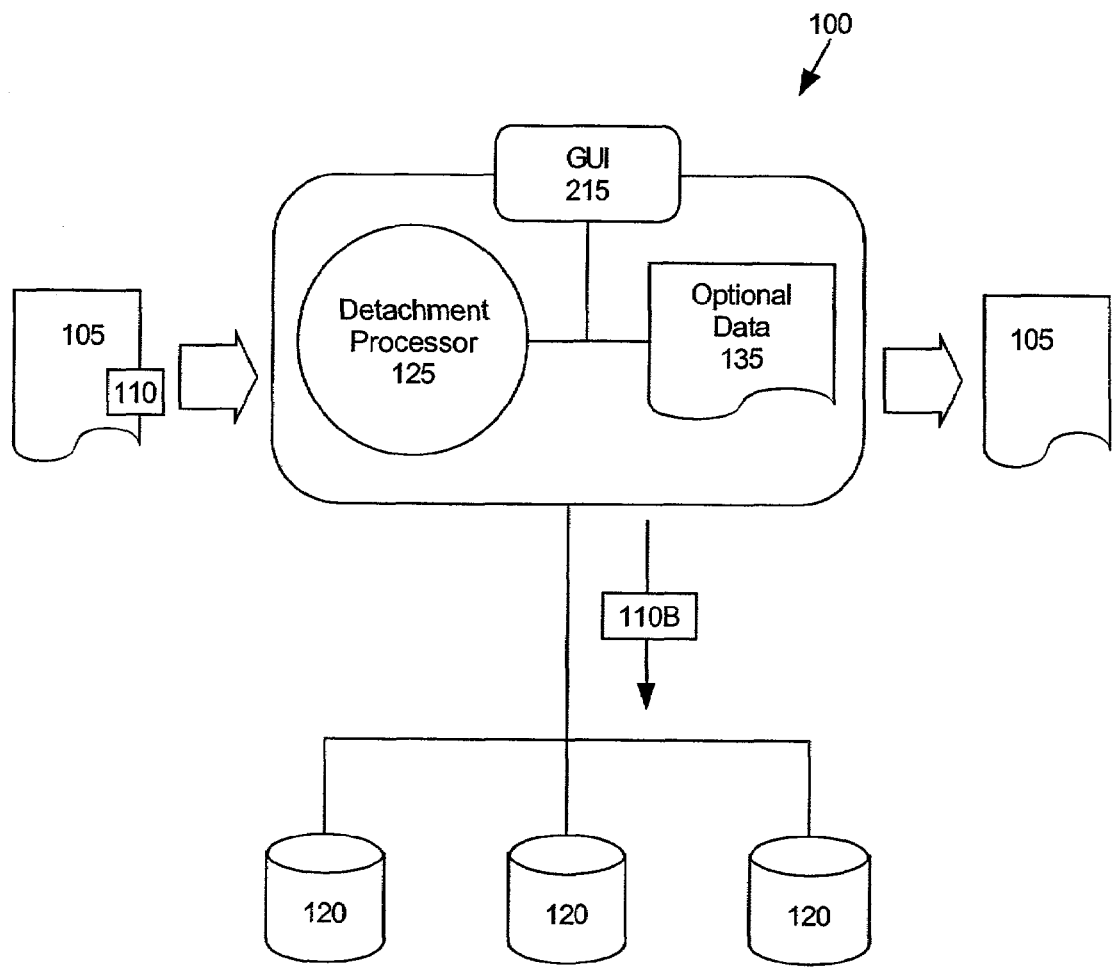
FIG. 1A is a schematic diagram illustrating a system for detaching files attached to electronic documents in accordance with another aspect of the inventive arrangements disclosed herein.

FIG. 1A is a schematic diagram illustrating a system for detaching files attached to electronic documents in accordance with another aspect of the inventive arrangements disclosed herein. The system of FIG. 1A is similar to the system of FIG. 1, with the noted exception that file 110 can be removed from the electronic document 105 and can be stored at a location associated with file 110. Thus, according to this embodiment of the invention, file 110B is the actual file that was originally attached to the electronic document 105. As shown, the resulting electronic document 105, having been processed by system 100, does not include an attachment file.

Although system 100 is depicted as a standalone application program, those skilled in the art will recognize that system 100 can be included as a component of a larger system. For example, the system 100 can be included within an electronic mail program or system, a database program or system, a collaboration program or system, or the like.

Figure 2:
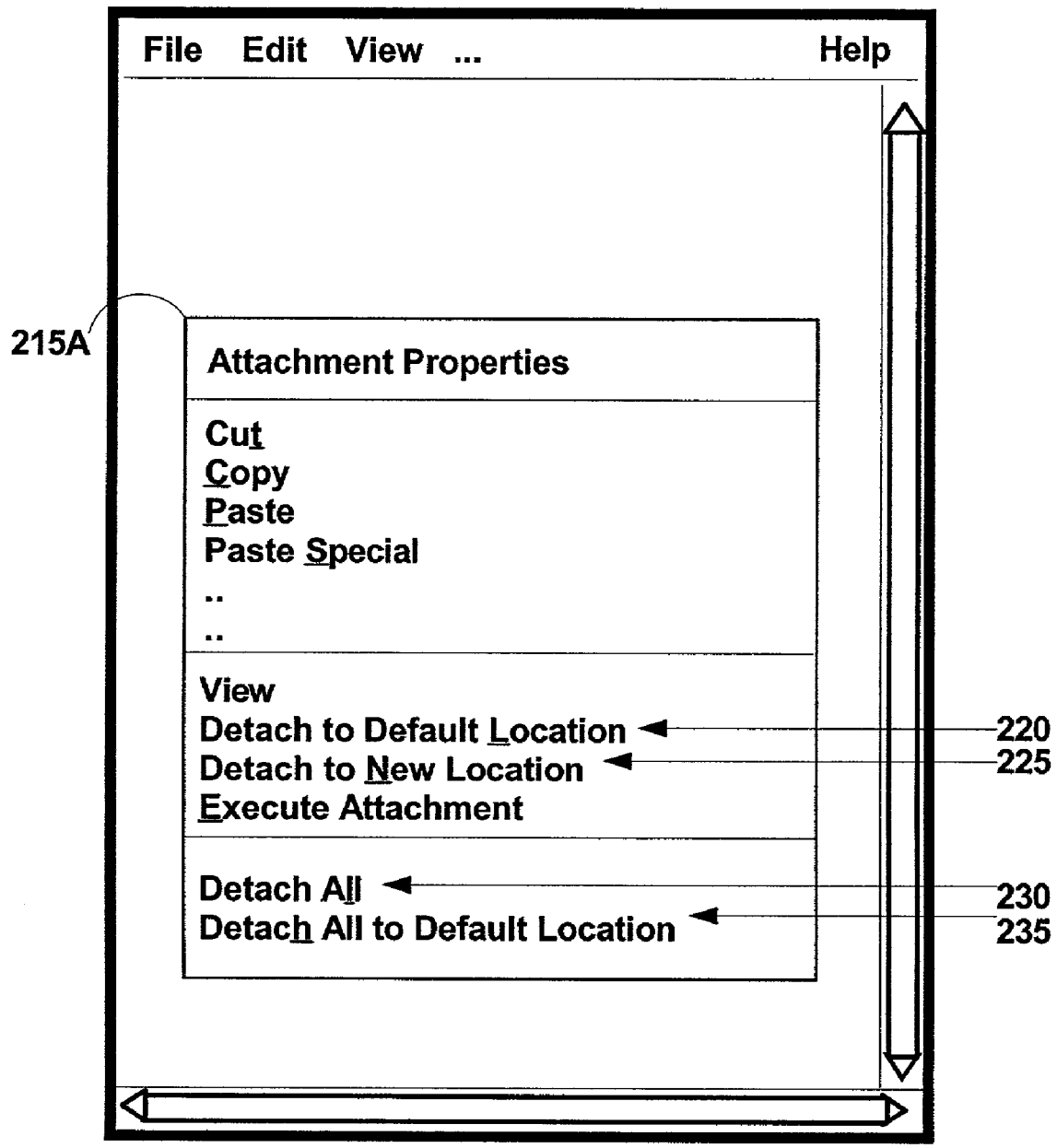
FIG. 2 is a schematic diagram illustrating a graphical user interface for detaching a file from an electronic document in accordance with the inventive arrangements disclosed herein.

FIG. 2 is a schematic diagram illustrating an exemplary GUI 215A for detaching a file attached to an electronic document in accordance with the inventive arrangements disclosed herein. In this embodiment of the invention, attached files remain attached to the electronic documents and copies of the attached files are placed at specified locations. Accordingly, in this embodiment, "detaching" can refer to making copies of attached files. As shown in FIG. 2, GUI 215A can include one or more menu items for manipulating files attached to electronic documents. The GUI 215A can include conventional attachment menu items such as "View", "Execute Attachment", "Cut", "Copy", "Paste", and the like. Additional menu items such as menu item 220, "Detach to Default Location", can be included for making a copy of the attached file and storing the copy at a predetermined, default location. The "Detach to New Location" menu option 225 can be used in cases where the user wishes to place a copy of the attached file at a location other than the default location.

The GUI 215A further can include menu options 230 and 235 for detaching multiple files from an electronic document. Accordingly, the "Detach All" menu item 230 can be used to make a copy of each file attached to an electronic document and place the copies at a single, user specified location, i.e. directory. The "Detach All to Default Location" menu item 235 can be used to make a copy of each file attached to an electronic document and place the copies at a predetermined default location. Notably, the default file location can be the same or different for each attached file as specified by a reference within the electronic document or the attached files themselves. If the location or path does not exist, the path can be created. The user also can be queried prior to creating the path.

Figure 2A:
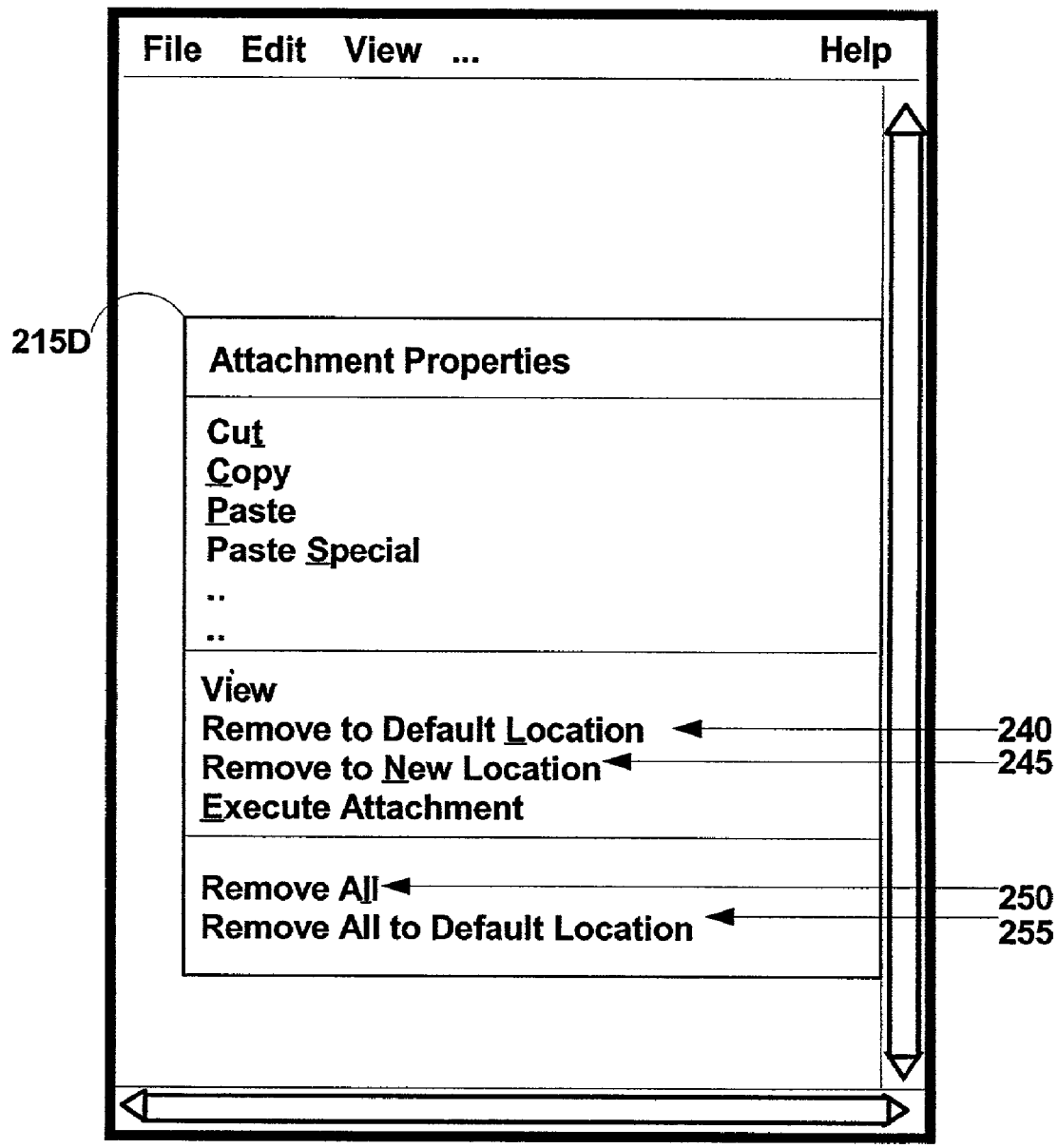
FIG. 2A is a schematic diagram illustrating another graphical user interface for detaching a file from an electronic document in accordance with the inventive arrangements disclosed herein.

FIG. 2A is a schematic diagram illustrating another exemplary GUI 215D for detaching a file attached to an electronic document in accordance with the inventive arrangements disclosed herein. In this embodiment of the invention, files can be removed from electronic documents and stored at a specified location. As shown in FIG. 2, GUI 215D can include many of the same menu items as GUI 215A with the exception that the options for detaching files result in the removal of the attached file from the electronic document. Accordingly, menu items such as menu item 240, "Remove to Default Location", can be included for removing an attached file from an electronic document and storing the originally attached file at a predetermined, default location. The "Remove to New Location" menu option 245 can be used in cases where the user wishes to remove an attached file from an electronic document and store the originally attached file at a location other than the default location.

The GUI 215D further can include menu options 250 and 255 for removing multiple files from an electronic document. Accordingly, the "Remove All" menu item 250 can be used to remove each file attached to an electronic document and store the originally attached files at a single, user specified location, i.e. directory. The "Remove All to Default Location" menu item 255 can be used to remove each file attached to an electronic document and store the originally attached files at a predetermined default location. As mentioned with regard to FIG. 2, the default file location can be the same or different for each attached file as specified by a reference within the electronic document or the attached files themselves. If the location or path does not exist, the path can be created. The user also can be queried prior to creating the path.

Notably, although the various options for removing attached files and making copies of attached files have been described in relation to two separate GUIs, those skilled in the art will recognize that the various menu options disclosed herein can be embodied within a single GUI. Additionally, according to the inventive arrangements disclosed herein, selection of any of the menu options where files are detached to default locations requires no further user interaction as would be required with conventional systems for detaching files. For example, in conventional systems, users typically must specify the location to which a file is detached or at least verify the location. In the present invention, in cases where the default location exists, the user need not specify or verify the default location.

Figure 3:
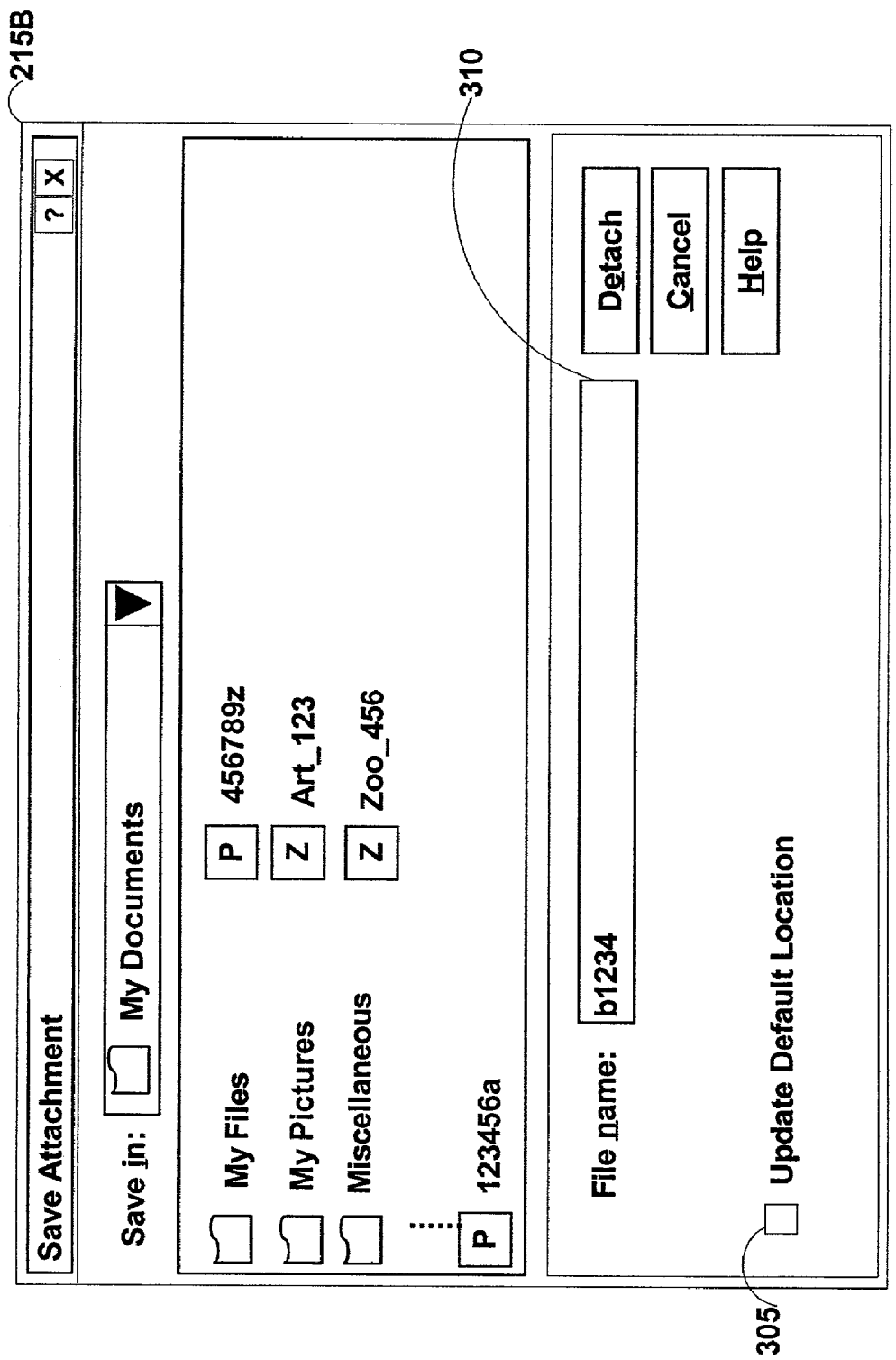
FIG. 3 is a schematic diagram illustrating another graphical user interface for detaching a file from an electronic document in accordance with the inventive arrangements disclosed herein.

FIG. 3 is a schematic diagram illustrating another exemplary GUI 215B for detaching one or more files to a user specified location in accordance with the inventive arrangements disclosed herein. The GUI 215B of FIG. 3 can be used in cases where the user wishes to detach one or more files to a user-specified location rather than the default location. For example, GUI 215B can be presented responsive to selection of the "Detach All" or "Detach to New Location" menu items of FIG. 2. Accordingly, the GUI 215B can include navigation controls allowing the user to specify a particular location, whether the location is on a storage device networked to the system 100 disclosed herein, or is a local storage device. The GUI 215B further can include a mechanism for updating the default location. Accordingly, GUI 215B can include a check-box 305 or another activatable icon for updating the default location with the location being specified. The "File name" input field 310 allows a user to specify a new name for the local copy of the attached file.

Figure 4:
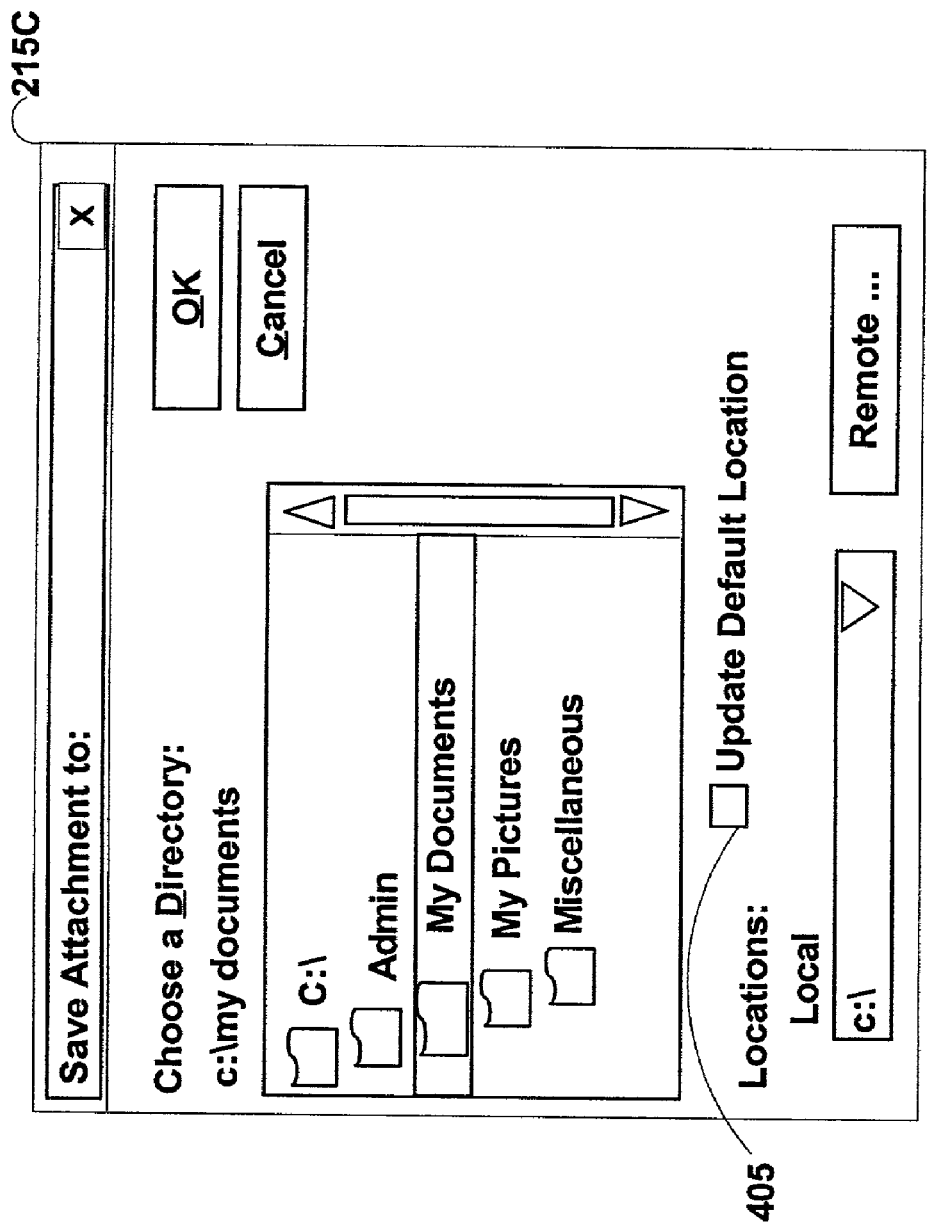
FIG. 4 is a schematic diagram illustrating another graphical user interface for detaching a file from an electronic document in accordance with the inventive arrangements disclosed herein.

FIG. 4 is a schematic diagram illustrating another exemplary GUI 215C for detaching one or more files attached to an electronic document in accordance with the inventive arrangements disclosed herein. Similar to the GUI of FIG. 3, GUI 215C can be used in cases where the user wishes to detach one or more files to a user-specified location rather than the default location. Thus, GUI 215C can include navigation controls allowing the user to specify a particular location to which one or more files can be detached. The GUI 215C further can include a mechanism for updating the default location such as a check-box 405, a radio button, or other activatable icon for updating the default location with the location being specified.

Figure 5:
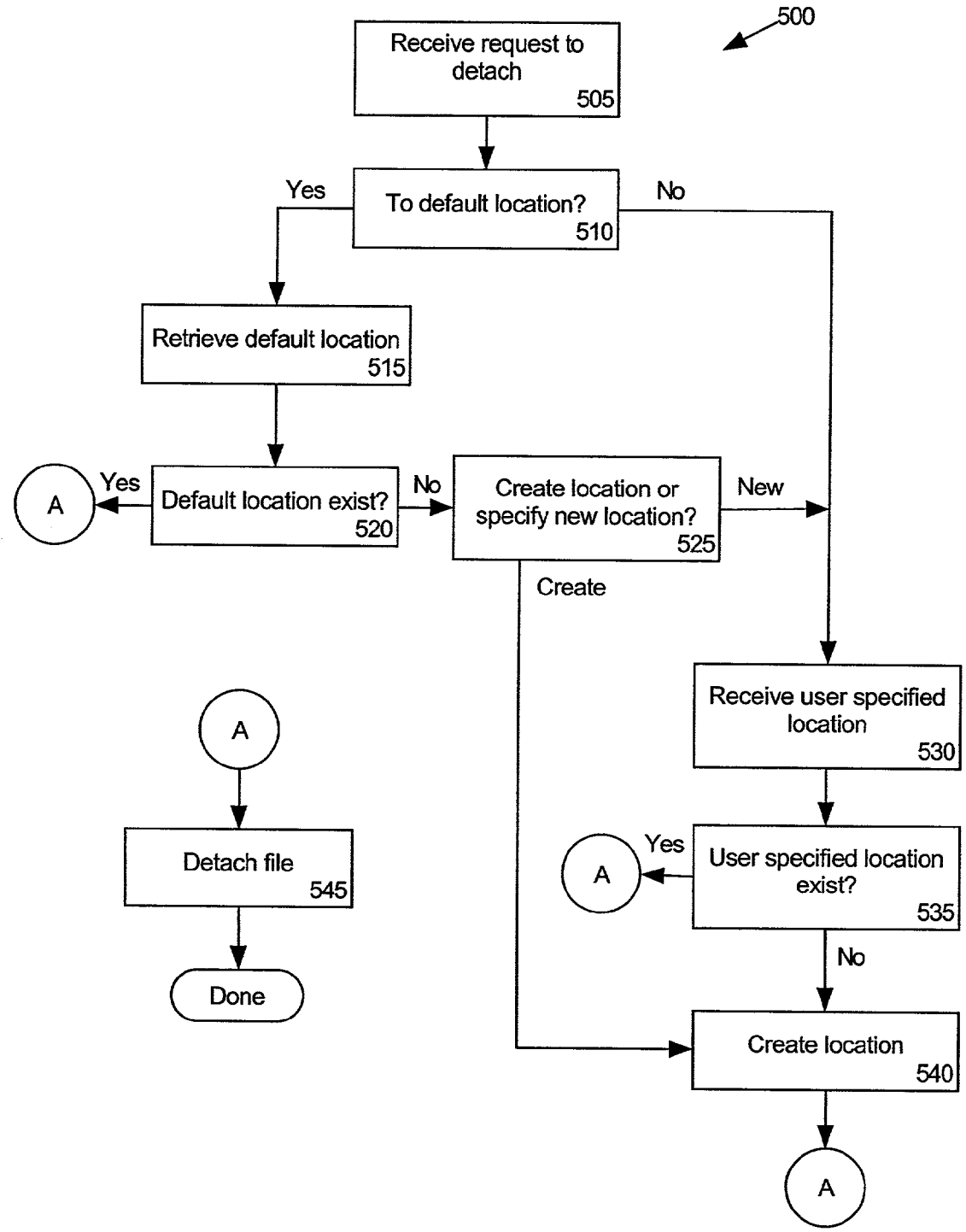
FIG. 5 is a flow chart illustrating a method of detaching a file from an electronic document in accordance with the inventive arrangements disclosed herein.

FIG. 5 is a flow chart illustrating a method 500 of detaching a file from an electronic document in accordance with the inventive arrangements disclosed herein. The method can begin in a state where one or more files have been attached to an electronic document such as an electronic mail, a hypertext document, or the like. Accordingly, the method can begin in step 505 where a request to detach a file from an electronic document can be received. In step 510, a determination can be made as to whether the request is to detach the file to a default location. If so, the method can continue to step 515 where the default location can be retrieved or extracted. As mentioned, the default location can be stored within the electronic document to which the file is attached, within the attachments themselves, within memory on a local data store, or within a data store communicatively linked to the invention disclosed herein through a computer communication network. Once the default location has been retrieved, the method can continue to step 520.

In step 520, a determination can be made as to whether the default location, i.e. the directory or the fully qualified location, exists. If so, the method can continue to jump circle A to detach the file to the default location in step 545. If not, however, the method can continue to step 525. In step 525, the user can be queried whether a new location should be specified or the default location should be created. For example, such can be the case where the default location specified within the electronic document does not correspond to a location on the user's local computer system. If the user wishes to specify a new location to which the file can be detached, the method can continue to step 530. If not, the method can continue to step 540.

In step 530, the user specified location can be received. For example, the user can interact with a GUI as disclosed herein to specify a particular location to detach a file. After completion of step 530, the method can proceed to step 535 where a determination can be made as to whether the user specified location exists. If so, the method can continue to jump circle A where the file can be detached to the specified location in step 545. As mentioned, the file attached to the electronic document can be detached by making a copy of the attached file and storing the copy at the specified location. Alternatively, the attached file can be detached by removing the actual attached file from the electronic document and storing the file at the specified location. If the user specified location does not exist, the method can continue to step 540. Accordingly, the location designated by the user in step 530 or the default location determined in step 515 can be created in step 545. After step 540, the method can continue to jump circle A to detach the file to the user specified location. After detaching the file from the electronic document, the method can end.

Notably, each time the user specifies a location to which one or more files are to be detached, the user can select an activatable icon so that the default location is updated with the user specified location. Depending upon the implementation of the invention, the updating step can update the default location on a per application basis, on a per file type basis, or only for the particular file or files being detached.

It should be appreciated by those skilled in the art, that in the case where multiple files have been attached to an electronic document, the user can select one or more of the attached files to detach. For example, the user can select a single attachment and detach the file to the default location or a user specified location. Alternatively, the user can select an option wherein each attachment is automatically detached from the electronic document and stored at a default location or a user specified location. Accordingly, when detaching files to default locations, the invention can allow one or more files to be detached using a single command rather than individually selecting each file and detaching each file individually. Additionally, it should be appreciated that the GUIs disclosed herein can be embodied in other forms. For example, individual single action activatable icons can be provided for each of file detaching functions disclosed herein. Thus, a user can detach one or more files from an electronic document with a single action.

The present invention can be realized in hardware, software, or a combination of hardware and software. The present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A computer-implemented method of detaching at least one attached file from an electronic document comprising:
   receiving a user command to detach a second document from a first document, wherein when attached, the first document and the second document both reside within a data repository;
   responsive to a user command, identifying a location where the at least one attached file is to be stored, wherein said location comprises at least one of a user-specified location and a default location, the default location being specified by a basis selected from a group consisting of a per-attached-file basis, a per-file-type basis, and a basis specified by an application designated to process said attached file, wherein the default location is external to the data repository;
   generating a detached file from said second document;
   storing said detached file at said location;
   creating a reference to the location and associating the reference with the first document; and
   deleting the second document from the repository.

2. The method of claim 1, wherein said detached file is a copy of said second document.

3. The method of claim 1, wherein said detached file is said second document having been removed from said first document.

4. A computer-implemented method of detaching at least one file from an electronic document comprising:
   responsive to a user command, identifying a location where the at least one attached file is to be stored, wherein said location is associated with the attached file;
   generating a detached file from at least one attached file; attached to said electronic document, said electronic document and said attached file residing within a data repository;
   identifying a location where said at least one detached file is to be stored, wherein said location comprises at least one of a user-specified location and default location, said default location being specified by a basis selected from a group consisting of a per-attached-file basis, a per-file-type basis, and a basis specified by an application designated to process said attached file, and wherein said location is external to said data repository; and
   storing said detached file at said location;
   creating a reference to said location and associating said reference with the electronic document; and
   deleting said attached file from said data repository.

5. The computer-implemented method of claim 4, wherein said identifying step, said generating step, and said storing step are responsive to a single user command.

6. The method of claim 4, further comprising:
   prior to said making step, replacing said identified location with a second user specified location.

7. The method of claim 4, wherein said identifying a location step comprises:
   identifying a location associated with a file type of the particular file attached to the electronic document.

8. The method of claim 4, further comprising:
   if said location does not exist, creating said location.

9. The method of claim 4, further comprising:
   if said location does not exist, querying a user for a new location.

10. The method of claim 4, said identifying a location step further comprising:
    extracting said location from within the electronic document.

11. A computer-implemented method of detaching at least one file from an electronic document comprising:
    responsive to a user command, generating a detached file from at least one attached file attached to said electronic document, said electronic document and said attached file residing within a data repository; identifying a location where the at least one detached file is to be stored, comprises a default location external to the data repository, and wherein said default location being specified by a basis selected from a group consisting of a per-attached-file basis, a per-file-type basis, and a basis specified by an application designated to process said attached file;

creating a reference to said location and associating the reference with said electronic document;
storing the attached file at said associated location; and
deleting said attached document from said repository.

12. The method of claim 11, wherein said identifying step, said removing step, and said storing step are responsive to a single user command.

13. The method of claim 11, further comprising:
wherein said location is associated with the attached file, and further comprising, prior to said generating step, replacing said location with a second user-specified location.

14. The method of claim 11, wherein said identifying a location step comprises:
identifying a location associated with a file type of the particular file attached to the electronic document.

15. The method of claim 11, further comprising:
if said location does not exist, creating said location.

16. The method of claim 11, further comprising:
if said location does not exist, querying a user for a new location.

17. The method of claim 11, said identifying a location step further comprising:
extracting said location from within the electronic document.

18. The method of claim 11, wherein said location is designated by a user.

19. The method of claim 11, wherein said attached file when stored is stored in the same format that said attached file was in before attachment to the electronic document.

20. A system for detaching at least one file from an electronic document comprising:
a graphical user interface configured to display at least one option for detaching attached at least one file from an electronic document when said attached file and electronic document reside within a data repository;
a detachment processor configured to respond to activation of one of said options by generating a detached file from said attached file, deleting said attached file from said repository and creating a reference to a location at which said attached file is to be stored;
wherein said location comprises at least one of a user-specified location and a default location, the default location being determined by the detachment processor if a user does not specify said location and being based on a basis selected from a group consisting of a per-attached-file basis, a per-file-type basis, and a basis specified by an application designated to process the file storing said detached file at said location;
creating a reference to the location and associating the reference with the first document; and
deleting the second document from the repository.

21. The system of claim 20, wherein said detachment processor is further configured to update said location with a second user specified location where the file is to be stored.

22. A graphical user interface for detaching at least one file attached to an electronic document, both residing in a data repository, said graphical user interface including at least one option for generating a detached file from the attached file, deleting the attached file from the data repository, and storing the detached file at a location comprising at least one of a user-specified location and a default location, the default location being specified by a basis selected from a group consisting of a per-attached-file basis, a per-file-type basis, and a basis specified by an application designated to process the at least one file and creating a reference to the location.

23. A machine-readable storage having stored thereon, a computer program having a plurality of code sections, said code sections executable by a machine for causing the machine to perform the steps of:
responsive to a user command, generating at least one detached file from an attached file attached to an electronic document when the electronic document and the attached file reside in a data repository; identifying a location where said at least one detached file is to be stored, wherein said location comprises at least one of a user-specified location and a default location, the default location being specified by a basis selected from a group consisting of a per-attached-file basis, a per-file-type basis, and a basis specified by an application designated to process the attached file;
generating a detached file from said attached file; and
storing said detached file at said location; and
deleting said attached file from the data repository.

24. The machine-readable storage of claim 23, wherein said detached file is a copy of said attached file.

25. The machine-readable storage of claim 23, wherein said detached file is said attached file having been removed from said electronic document.

26. A machine-readable storage having stored thereon, a computer program having a plurality of code sections, said code sections executable by a machine for causing the machine to perform the steps of:
responsive to a user command, generating at least one detached file from an attached file attached to an electronic document when the electronic document and the attached file reside in a data repository; identifying a location where said the detached file is to be stored, wherein said location comprises at least one of a user-specified location and default location, said default location being specified by a basis selected from a group consisting of a per-attached-file basis, a per-file-type basis, and a basis specified by an application designated to process said attached file; the location is associated with the attached file;
making a copy of the attached file; and
storing said copy of the detached file at said location deleting said attached file; and creating a reference to the location and associating the reference with the electronic document.

27. The machine-readable storage of claim 26, wherein said identifying step, said making step, and said storing step are responsive to a single user command.

28. The machine-readable storage of claim 26, further comprising:
prior to said making step, replacing said identified location with a second user specified location.

29. The machine-readable storage of claim 26, wherein said identifying a location step comprises:
identifying a location associated with a file type of the particular file attached to the electronic document.

30. The machine-readable storage of claim 26, further comprising:
if said location does not exist, creating said location.

31. The machine-readable storage of claim 26, further comprising:
if said location does not exist, querying a user for a new location.

32. The machine-readable storage of claim 26, said identifying a location step further comprising:
extracting said location from within the electronic document.

33. A machine-readable storage having stored thereon, a computer program having a plurality of code sections, said code sections executable by a machine for causing the machine to perform the steps of:

responsive to a user command, generating at least one detached file from an attached file attached to an electronic document when the electronic document and the attached file reside in a data repository; identifying a location where said the at least one detached file is to be stored, wherein said location comprises at least one of a user-specified location and default location, said default location being specified by a basis selected from a group consisting of a per-attached-file basis, a per-file-type basis, and a basis specified by an application designated to process said attached file; wherein the location is associated with the attached file;

attached to an electronic file defining an attached file and storing the attached file at said location creating a reference to said location and associating said reference with the electronic document; and deleting said electronic document from the data repository.

34. The machine-readable storage of claim 33, wherein said identifying step, said removing step and said storing step are responsive to a single user command.

35. The machine-readable storage of claim 33, farther comprising:

wherein said location is associated with the attached file, and further comprising, prior to said generating step, replacing said location with a second user-specified location.

36. The machine-readable storage of claim 33, wherein said identifying a location step comprises:

identifying a location associated with a file type of the particular file attached to the electronic document.

37. The machine-readable storage of claim 33, further comprising:

if said location does not exist, creating said location.

38. The machine-readable storage of claim 33, further comprising:

if said location does not exist, querying a user for a new location.

39. The machine-readable storage of claim 33, said identifying a location step further comprising:

extracting said location from within the electronic document.

* * * * *